US008965331B2

United States Patent
Ray et al.

(10) Patent No.: US 8,965,331 B2
(45) Date of Patent: Feb. 24, 2015

(54) TRAFFIC MANAGEMENT FOR BASE STATIONS BACKHAULED OVER DATA-CAPPED NETWORK CONNECTIONS

(75) Inventors: Siddharth Ray, Palo Alto, CA (US); Murari Srinivasan, Palo Alto, CA (US); Milo Steven Medin, Redwood City, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 13/604,741

(22) Filed: Sep. 6, 2012

(65) Prior Publication Data

US 2014/0066006 A1 Mar. 6, 2014

(51) Int. Cl.
- *H04M 11/00* (2006.01)
- *H04W 72/00* (2009.01)
- *H04L 12/26* (2006.01)
- *H04J 3/16* (2006.01)

(52) U.S. Cl.
USPC ........ 455/406; 455/405; 455/452.1; 455/453; 370/230; 370/235; 370/465

(58) Field of Classification Search
USPC .......... 455/405, 418–420, 423, 436–444, 455/450–453, 464; 370/230–235, 252, 437, 370/465; 375/225; 709/224–226, 233–235
See application file for complete search history.

(56) References Cited

U.S. PATENT DOCUMENTS

| 7,855,977 | B2 | 12/2010 | Morrison et al. |
| 7,873,074 | B1* | 1/2011 | Boland ................. 370/468 |
| 7,929,444 | B2 | 4/2011 | Lin |
| 8,103,310 | B1 | 1/2012 | Srinivas et al. |
| 8,169,933 | B2 | 5/2012 | Srinivasan et al. |
| 2007/0184869 | A1* | 8/2007 | Koo et al. ................. 455/522 |
| 2009/0227263 | A1 | 9/2009 | Agrawal et al. |
| 2010/0136998 | A1 | 6/2010 | Lott et al. |
| 2010/0240368 | A1 | 9/2010 | Fox et al. |
| 2010/0240373 | A1 | 9/2010 | Ji et al. |
| 2010/0316012 | A1 | 12/2010 | Stanwood et al. |
| 2012/0058777 | A1 | 3/2012 | Nguyen et al. |
| 2012/0063383 | A1 | 3/2012 | Barbieri et al. |
| 2012/0220260 | A1* | 8/2012 | Bandera et al. ............. 455/405 |

(Continued)

FOREIGN PATENT DOCUMENTS

| KR | 10-2009-0076675 A | 7/2009 |
| KR | 10-2012-0012865 A | 2/2012 |

OTHER PUBLICATIONS

"A new kind of network: Open indoor femtos for both indoor and outdoor coverage", Dec. 2011, Corporate R&D, Qualcomm, pp. 1-13.

(Continued)

*Primary Examiner* — Michael Mapa
(74) *Attorney, Agent, or Firm* — Honigman Miller Schwartz and Cohn LLP (57) ABSTRACT

A network device connected to a base station via a backhaul connection may be operable to determine whether the backhaul connection is congested. The determination may be based on a periodic data cap imposed on the backhaul connections. In response to a determination that the backhaul connection is congested, the network device may configure one or more cellular communication parameters of one or more of the plurality of base stations. The determination may be based on one or more of: a total amount of data consumed over the backhaul connection during a current time period, a traffic load on the backhaul connection, and an amount of time remaining in the current time period.

16 Claims, 7 Drawing Sheets

(56) References Cited

U.S. PATENT DOCUMENTS

2013/0070742 A1* 3/2013 Picker et al. ............... 370/338
2013/0132559 A1* 5/2013 Kotecha et al. ............ 709/224
2013/0225181 A1* 8/2013 Radulescu et al. ......... 455/442

OTHER PUBLICATIONS

International Search Report and Written Opinion for Application No. PCT/US2013/048886, dated Oct. 25, 2013.
Specification and Drawings of Unpublished U.S. Appl. No. 13/604,748, filed Sep. 6, 2012.

* cited by examiner

| Connection ID 172 | Total Data Consumed (B) 174 | Periodic Data Cap (D) 176 | Time Remaining (T) 178 | Traffic Load (L) 180 | Maximum Load (M) 182 |
|---|---|---|---|---|---|
| 170a | 100 GB | 250 GB | 10000 seconds | 7 MBps | 12 Mbps |
| 170b | 200 GB | 250 GB | 10000 seconds | 7 MBps | 12 Mbps |
| 170c | 50 GB | 250 GB | 10000 seconds | 9 MBps | 12 Mbps |
| 170c | 50 GB | 250 GB | 10000 seconds | 10 MBps | 12 Mbps |

TRAFFIC MANAGEMENT FOR BASE STATIONS BACKHAULED OVER DATA-CAPPED NETWORK CONNECTIONS

TECHNICAL FIELD

Aspects of the present application relate to wireless communications. More specifically, to a method and apparatus for managing traffic handled by base stations backhauled over data-capped network connections.

BACKGROUND

Deploying small-cell (e.g., femtocell) base stations in homes and businesses may present challenges not faced in the deployment of macrocell base stations. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A method and apparatus is provided for wireless communications, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. Hardware may comprise, for example, one or more processors, ASICs, and/or FPGAs. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduce a list of one or more non-limiting examples, instances, or illustrations.

In an example implementation, a network device of a first service provider may determine that a total amount of data communicated over a backhaul connection of a base station during a current billing period will exceed a maximum amount of data permitted to be communicated over the backhaul connection during the current billing period. The maximum amount of data permitted to be communicated over the network connection may be imposed by a second service provider. The determining may be based on a traffic load on the network connection over the current billing period. In response to a determination that the backhaul connection is congested, a value of one or more cellular communication parameters utilized by the base station may be reconfigured.

Figure 1A:
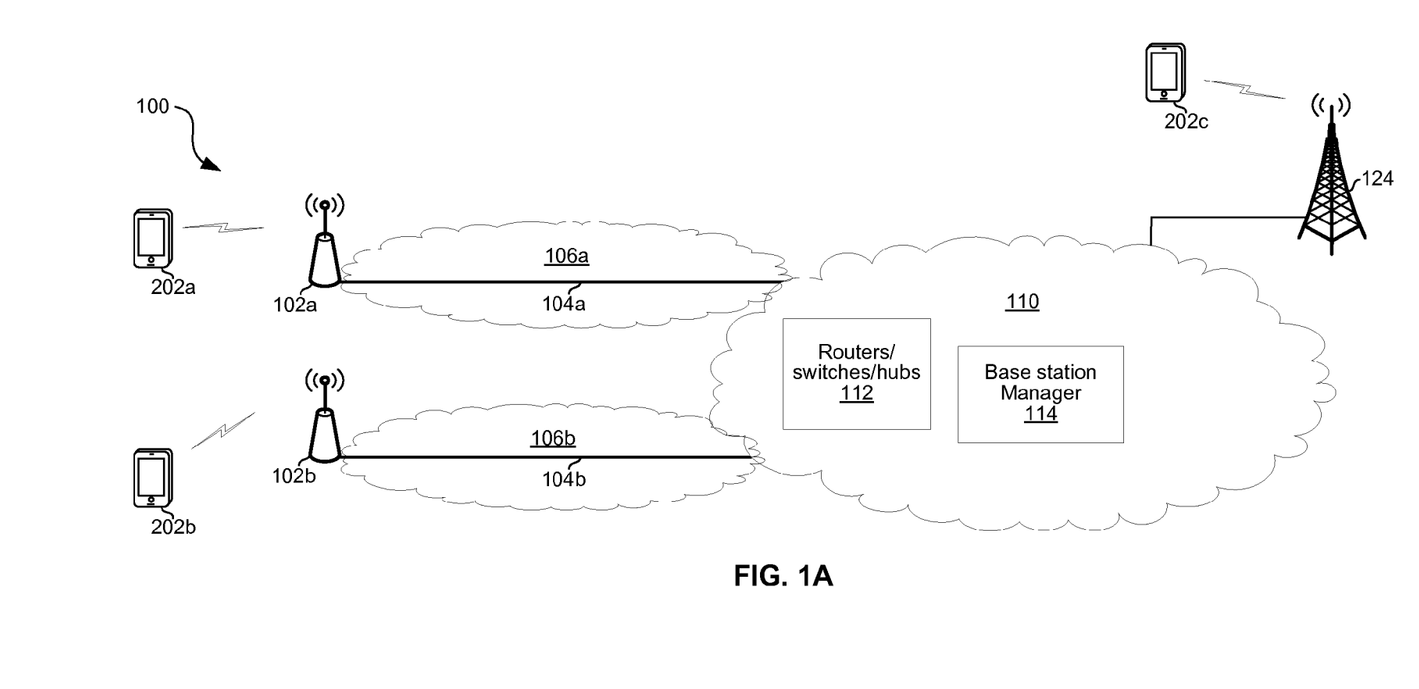
FIG. 1A depicts an example of a network comprising a plurality of small-cell base stations backhauled over data-capped network connections.

FIG. 1A depicts an example of a network comprising a plurality of small-cell base stations backhauled over data-capped network connections. The network 100 comprises base stations 102a, 102b, and 124; and subnetworks 106a, 106b, and 110.

The subnetwork 110 may be a core network of a service provider that provides network access to mobile devices. The subnetwork 110 may be, for example, a core network 110 of a cellular service provider. The core network 110 may comprise various components 112 (e.g., routers, switches, hubs, etc.) for connecting the core network to the access networks 106a and 106b and to the base station 124. The core network 110 may comprise a base station manager 114 which may operate as described herein.

Each of the base stations 102a and 102b may be operable to communicate data between mobile devices (e.g., devices 202a and 202b) and a respective one of the subnetworks 106a and 106b. In this regard, base station 102a may communicate data between mobile device 202a and the subnetwork 106a, and base station 102b may communicate data between mobile device 202b and subnetwork 106b. In this regard, each of the base stations 102a and 102b may support any one or more wireless (e.g., Wi-Fi, LTE), wired (e.g., Ethernet, DSL), and/or optical (e.g., Fibre Channel) protocols. Each of the base stations 102a and 102b may comprise circuitry operable to implement functions of a base station described herein.

In an example implementation, the base stations 102a and 102b may be associated with the cellular provider that is associated with the core network 110. In this regard, one or more agreements may be in place between the owner(s) of the base stations 102a and 102b such that the base stations 102a and 102b are permitted to communicate on frequencies owned/leased by the cellular provider.

The connection 104a through the subnetwork 106a may carry backhaul traffic for the base station 102a. The connection 104b through the subnetwork 106b may carry backhaul traffic for the base station 102b. Each of the connections 104a and 104b may comprise one or more wired, wireless, and/or optical network links.

Each of the subnetworks 106a and 106b may be an access network of a respective Internet service provider (ISP). Accordingly, each of the base stations 102a and 102b may be associated with a contract between a subscriber and an ISP that provides one of the access networks 106a and 106b. The subnetwork 106a may be, for example, an access network of a cable television provider, where the owner and/or lessee of the base station 102a has an account with the cable television provider, and the base station 102a is associated with the contract, thus permitting the base station 102a to communicate over the network 106a. The subnetwork 106b may be, for example, an access network of an xDSL provider, where the owner and/or lessee of the base station 102b has an account with the xDSL provider, and the base station 102b is associated with the contract, thus permitting the base station 102a to communicate over the network 106a.

In an example implementation, the cellular provider may not have control, or at least not sole control, over the access networks 106a and 106b. For example, the ISPs associated with the access networks 106a and 106b may be separate entities than the cellular provider associated with the core network 110. Consequently, restrictions, such as periodic data caps and/or maximum traffic loads, imposed on the connections 104a and 104b may be, at least partially, out of the control of the cellular provider. Periodic data caps may be measured in, for example, bits or bytes. A traffic load may be measured in, for example, bits or bytes per unit time (e.g., megabits per second (Mbps) or megabytes per second (MBps)). A traffic load may be, for example, an instantaneous traffic load at one or more time instants, an average traffic load averaged over a time period (e.g., an hour, day, week, month, year, or billing period), and/or an average traffic load broken down by category (e.g., by time of day, time of week, and/or time of year).

The base station manager 114 may be operable to collect information about the backhaul connections 104a and 104b and utilize the information for managing the respective traffic loads on the base stations 102a and 102b. The collected information may be stored in a data structure, such as the one described below with respect to FIG. 1D, which may be part of, and/or accessible by, the base station manager 114. Collected information may be, for example, updated continuously, periodically, and/or on an event-driven basis. The base station manager 114 may comprise circuitry which resides in a single device or is distributed among a plurality of devices. In this regard, although an example implementation is depicted in which the base station manager 114 resides entirely in the core network 110, the base station manager 114 could reside entirely or partly in any one or more of the base station 102a, the base station 102b, and the core network 110.

Managing the respective traffic loads on the base stations 102a and 102b may comprise reconfiguring a value of one or more parameters utilized by one or both of the base stations 102a and 102b. The parameters may include, for example: transmit power, receive sensitivity, channels to utilize, one or more quality of service (QoS) thresholds above and/or below which traffic is to be accepted and/or dropped, identifiers of permitted and/or denied traffic flows, whether particular base stations may accept inbound handovers, whether particular base stations should initiate outbound handovers, and/or any other parameters useful for managing the respective traffic loads on the base stations 102a and 102b.

Additionally or alternatively, managing the respective traffic loads on the base stations 102a and 102b may comprise communication of network management messages. Such messages may be communicated, for example, between the base stations 102a and 102b, between the base station 102a and the core network 110 (e.g., components 112 and/or the base station manager 114), and/or between the base station 102b and the core network 110 (e.g., components 112 and/or the base station manager 114). The network management messages may be communicated in-band and/or out-of-band with one or both of the connections 104a and 104b.

The collected information may include, for example, one or more maximum permitted traffic loads for the connection 104a (which may be imposed by the ISP that provides connection 104a), and/or a one or more maximum permitted traffic loads for the connection 104b (which may be imposed by the ISP that provides connection 104b). For example, the ISP that provides connection 104a may impose a maximum downstream load of 50 Mbps, and a maximum upstream load of 10 Mbps.

The collected information may, for example, include a periodic data cap imposed on the connection 104a, and/or a periodic data cap imposed on the connection 104b. For example, the ISP that provides connection 104a may impose a monthly data cap of 250 GB and the ISP that provides connection 104b may impose a monthly data cap of 300 GB. In some instances, the periodic data cap and the maximum load of a connection may be interrelated. For example, the ISP that provides connection 104a may impose a maximum of 50 Mbps up to the first 250 GB in a billing cycle and a maximum load of 10 Mbps for amounts in excess of 250 GB in a single billing cycle.

The collected information may include, for example, a total amount of traffic communicated over the connection 104a during one or more time periods, and/or a total amount of traffic communicated over the connection 104b during one or more time periods. A time period may be, for example, an hour, day, week, month, year, and/or billing period (e.g., the billing period for subscriber's contract with an ISP). In some instances, the total amount of traffic may include only traffic that counts towards a subscriber's periodic allotment. For example, the ISP that provides connection 104a may impose a monthly data cap of 250 GB, but only DOCSIS data may count toward that allotment while cable television programming may not count toward the 250 GB allotment.

The collected information may include, for example, the one or more traffic load values for one or both of the connections 104a and 104b. For example, a current instantaneous traffic load and/or an average traffic load over a current, in-progress time period may be collected for each of the connections 104a and 104b.

The base station manager 114 may collect information about the connections 104a and/or 104b through the communication of management messages with other network devices (e.g., the base stations 102a and 102b, devices in the access networks 106a and 106b, and/or devices in the core network 110). For example, other devices may collect information as traffic arrives at and/or traverses them. Such devices may communicate such collected information to the base station manager 114 on a periodic or event-driven basis (e.g., in response to a request from the base station manager 114). Additionally or alternatively, the management messages may comprise probe messages utilized to measure various network information.

In operation, the base stations 102a and 102b may communicate data to and/or from mobile devices (e.g., devices 202a and 202b) utilizing cellular protocols (e.g., LTE). Such data may be backhauled to and/or from the core network 110 via a respective one of network connections 104a and 104b. Values of one or more parameters utilized by the base stations 102a and 102b may be configured by the base station manager 114 in order to manage respective traffic loads on the base stations 102a and 102b. The configuration of the parameters may be based on collected information about the respective traffic loads on the backhaul connections 104a and 104b.

The collected information may be utilized to determine whether the traffic load on the connection 104a and/or the traffic load on the connection 104b has exceeded a threshold such as to be considered "congested." The determination of whether a connection is congested may, for example, be made periodically and/or made occasionally in response to a triggering event or condition.

A threshold for considering a connection congested may, for example, be calculated as shown below in EQ 1.

$$CT = (D-B)/T \qquad \text{EQ. 1}$$

where 'CT' is the congestion threshold measured in bits per unit time, 'D' is the periodic data cap measured in bits, 'B' is the total amount of data consumed over the connection during the current time period (measured in bits), and 'T' is the amount of time (e.g., measured in days, weeks, bi-weekly intervals, semi-monthly intervals, and/or months) remaining in the current time period. In such an instance, the connection may be determined to be congested if the following expression $$L > CT? \qquad \text{EQ. 2}$$

evaluates to true, where L is a traffic load on the connection.

A connection may, for example, be determined to be congested if the following expression:

$$L > (S)(M)? \qquad \text{EQ. 3}$$

evaluates to true, where 'L' is a traffic load on the connection, 'S' is a scaling factor, and 'M' is a maximum permitted load of the connection.

Figure 1B:
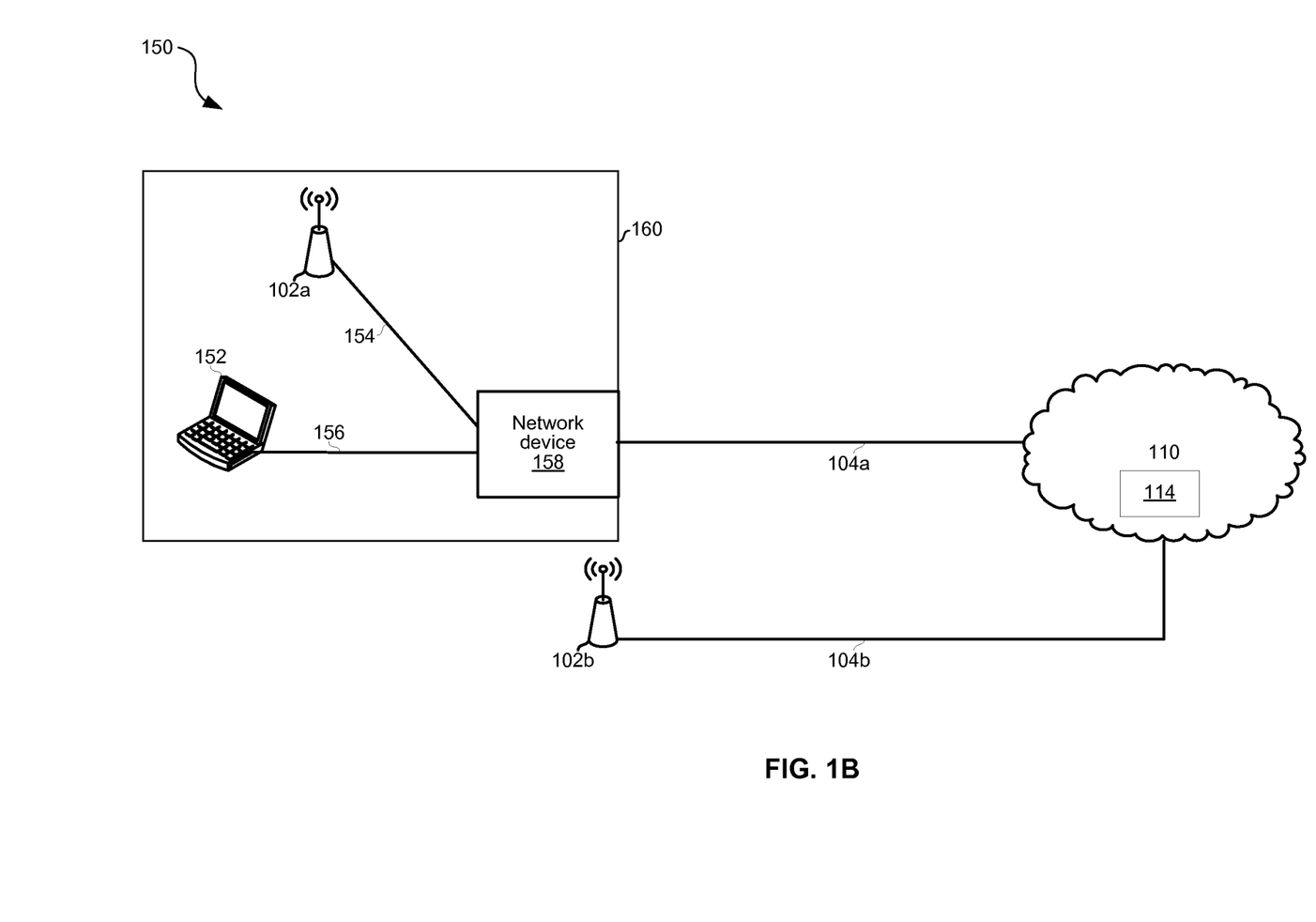
FIG. 1B depicts an example of a network comprising a plurality of small-cell base stations.

FIG. 1B depicts an example of a network comprising a plurality of small-cell base stations. In the network 150 depicted in FIG. 1B, again shown are the base stations 102a and 102b, the connections 104a and 104b, the subnetwork 110, and the base station manager 114. Additionally, network devices 152 and 158 and network links 154 and 156 are shown.

The network device 152 may comprise a non-base station device such as, for example, a laptop or desktop computer that is not configured to function as a base station. The device 152 may reside within a premises 160 (e.g., a residence, business or public venue) along with the base station 102a. The device 152 may comprise circuitry operable to implement functions of the network device 152 described herein.

The network device 158 may comprise a non-base station device such as, for example, a router or network switch that is not configured to function as a base station which may communicate with the base stations 102a and non-base station device 152 via network links 154 and 156 respectively. The network device 158 may reside within the premises 160 along with the base station 102a. The network device 158 may comprise circuitry operable to implement functions of the network device 158 described herein.

The connection 104a may provide an Internet connection to the premises 160. Thus, the connection 104a may carry data to and/or from both the base station 102a and the non-base station device 152. Data to and/or from the network device 152 may comprise, for example, website data, file uploads, file downloads, and/or any other traffic which a residence and/or business may communicate to and/or from the Internet. Because data to and/or from the base station 102a shares the connection 104a with data to and/or from the non-base station device 152, the latter may be accounted for by the base station manager 114 when collecting information about the connection 104a and/or when determining whether the connection 104a is congested. For example, where the respective cellular traffic loads on the base stations 102a and 102b are roughly equal, but device 152 is generating a lot of traffic, connection 104a may be congested whereas connection 104b is not. Accordingly, the base station manager 114 may take action to redistribute the existing loads (e.g., through handovers and/or traffic filtering) and/or to balance the respective loads going forward (e.g., encourage or force new connections to be established with the base station 102b rather than the base station 102, where possible).

In addition to routing/switching/bridging traffic between the connection 104a and the links 154 and 156, the network device 158 may perform and/or aid in the collection of information about the connection 104a. In this regard, the network device 158 may be a component of the base station manager 114 and/or may exchange network management messages with the base station manager 114.

Figure 1C:
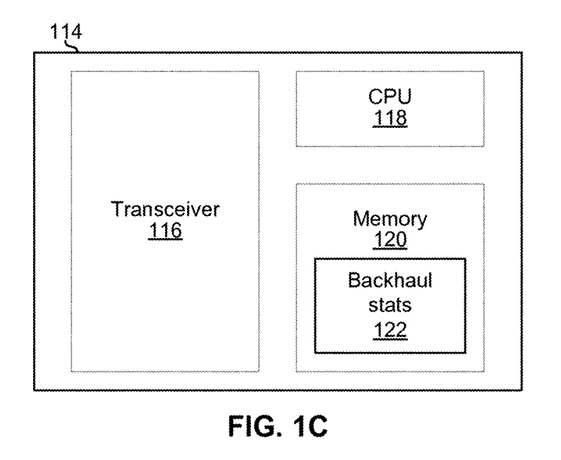
FIG. 1C is a block diagram of an example base station manager.

FIG. 1C is a block diagram of an example base station manager. In the example implementation depicted, the circuitry of the base station manager 114 comprises a transceiver 116, a CPU 118, and a memory 120.

The transceiver 116 may be operable to communicate in accordance with one or more communications protocols for communicating over wired, wireless, and/or optical links. The transceiver 116 may, for example, communicate utilizing the Internet protocol suite (including TCP and/or IP).

The CPU 118 may be operable to effectuate operation of the base station manager 114 by executing lines of code stored in the memory 120. Such lines of code may include, for example, one or more programs for collecting and analyzing network information to generate decisions regarding the management of network traffic.

The memory 120 may comprise program memory, runtime memory, and/or mass storage. The memory 120 may, for example, comprise non-volatile memory, volatile memory, read only memory (ROM), random access memory (RAM), flash memory, magnetic storage, and/or any other suitable memory. Program memory may store lines of code executable by the CPU 118 to effectuate operation of network management actions. Runtime memory may store data generated and/or used during execution of the network management programs. For example, runtime memory may store values utilized in evaluating, and/or the results of evaluating, equations 1-3 above. Mass storage may, for example, store data that becomes too large for efficient storage in runtime memory. For example, collected information regarding connections 104a and 104b may be stored in mass storage in a data structure 122 and portions of that data may be loaded into runtime memory as needed. An example of the data structure 122 is described below with reference to FIG. 1D.

Figure 1D:
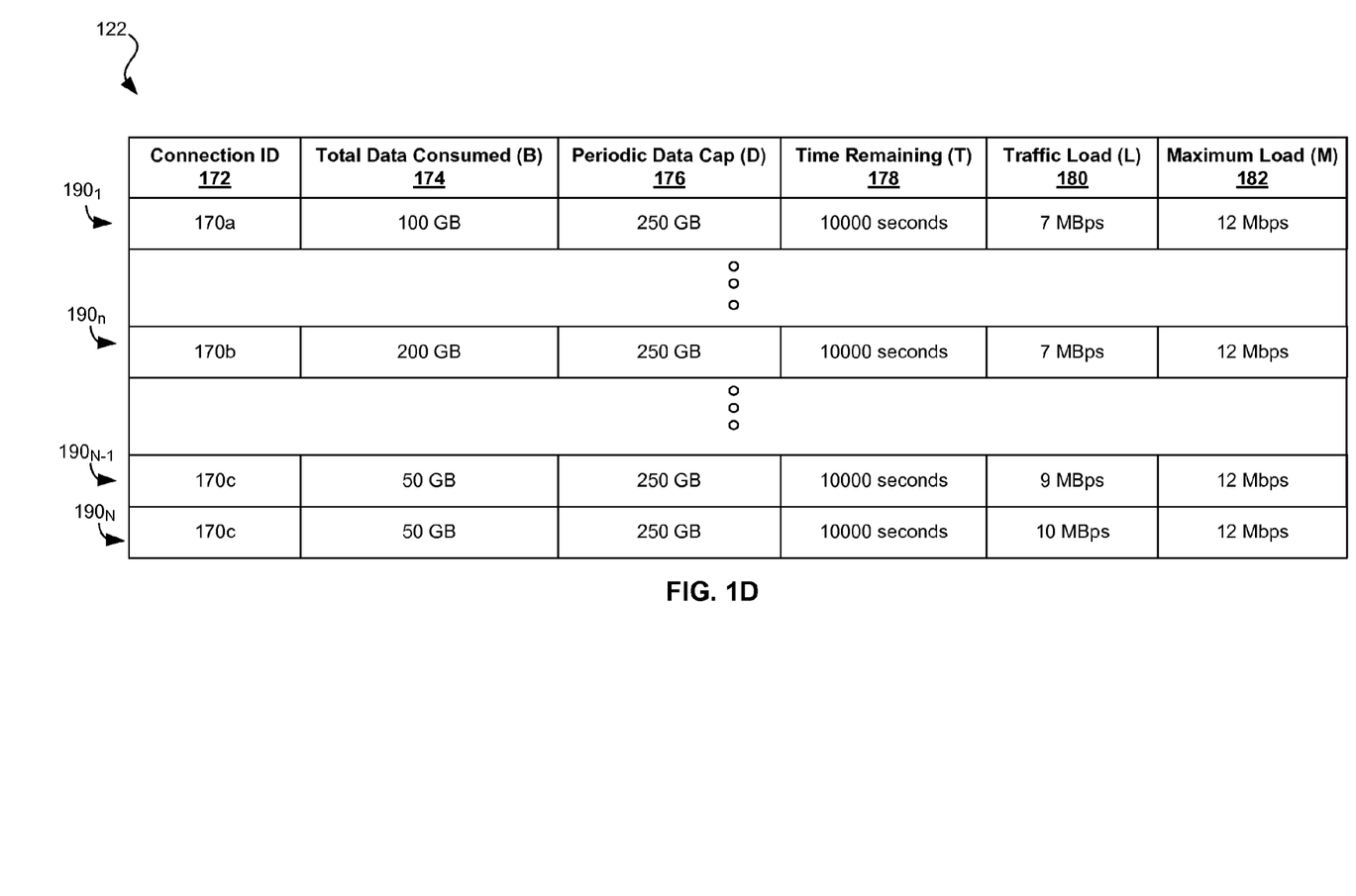
FIG. 1D is an example of a data structure utilized for managing a small-cell network to mitigate congestion of backhaul connections.

FIG. 1D is an example of a data structure utilized for managing a small-cell network to mitigate congestion of backhaul connections. Each of the entries $190_1$-$190_N$ (where 'N' is an integer and 'n' is a value between 1 and 'N') in the data structure 122 is associated with a particular backhaul connection and comprises current conditions of (e.g., traffic load) and/or constraints on (e.g., data rate limit and/or periodic data cap) the particular backhaul connection. In the implementation depicted, each entry $190_n$ comprises: a field 172 which stores an identifier associated with a particular backhaul connection, a field 174 which stores the total amount of data consumed over the connection during a time period (e.g., the current month or a previous month), a field 176 which stores the periodic data cap imposed on the connection, a field 178 which stores an amount of time left in the time period, a field 180 which stores a traffic load on the connection, and a field 182 which stores a maximum load imposed on the connection. Each of the fields in FIG. 1D is populated with arbitrary values to illustrate how the stored values may be utilized to determine whether a connection is congested.

Table 1 below illustrates example congestion determinations made utilizing equations 1 and 2 described above.

TABLE 1

| Congestion Determination using EQ. 1 | | | |
|---|---|---|---|
| Connection | CT | L | Congested? |
| 170a | 15 MBps | 7 MBps | NO |
| 170b | 5 MBps | 7 MBps | YES |

TABLE 1-continued

Congestion Determination using EQ. 1

| Connection | CT | L | Congested? |
|---|---|---|---|
| 170c | 20 MBps | 9 MBps | NO |
| 170d | 20 MBps | 10 MBps | NO |

Thus, table 1 illustrates an example scenario in which connection 170b is determined to be congested as a result of the fact that, based on its traffic load, L, the connection 170b will exceed its periodic data cap for the time period. The consequences of exceeding the data cap may depend on policies of the service provider that provides the connection 170c, but such consequences could include, for example, the connection 170c being disabled or a data rate of the connection 170c being throttled down. The loss of connection 170c would result in a base station that is backhauled by the connection 170c being unable to provide service to mobile devices. This, in turn, could result in a "hole" or "dead zone" in the cellular provider's coverage. Accordingly, the base station manager 114 may take action to attempt to reduce the load on the connection 170c.

Table 2 below illustrates example congestion determinations utilizing equation 3 described above and a hypothetical scaling factor, S, of 0.8. The scaling factor may be configured by the cellular provider based, for example, on performance data (e.g., load variance, traffic latency, dropped packets, etc.). By using a scaling factor 0.8, 20% headroom is reserved for handling transient traffic spikes, for example.

TABLE 2

Congestion Determination using EQ. 3

| Connection | S × M | L | Congested? |
|---|---|---|---|
| 170a | 9.6 MBps | 7 MBps | NO |
| 170b | 9.6 MBps | 7 MBps | NO |
| 170c | 9.6 MBps | 9 MBps | NO |
| 170d | 9.6 MBps | 10 MBps | YES |

Thus, table 2 illustrates an example scenario in which connection 170d is determined to be congested as a result of the fact that its traffic load exceeds 80% of its maximum permitted load. Operating with a load above S×M could, for example, increase latency and/or the likelihood of dropped packets, which may negatively impact the experience of mobile device users.

Figure 2A:
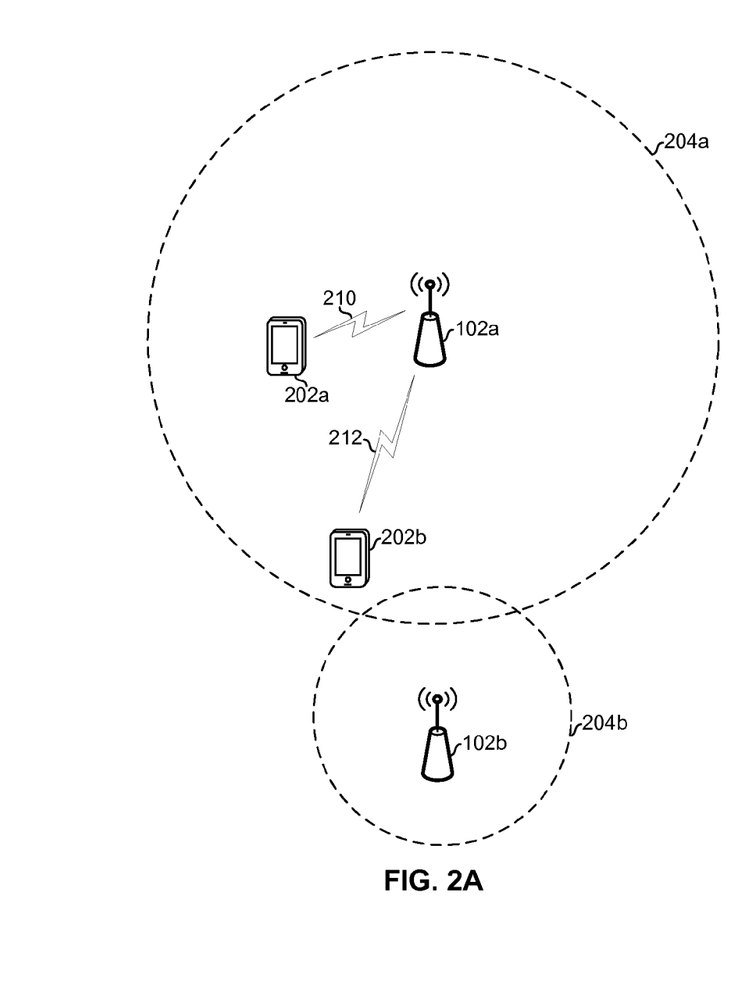
FIGS. 2A and 2B illustrate reconfiguration of a cell boundary in response to a backhaul connection becoming congested.
Figure 2B:
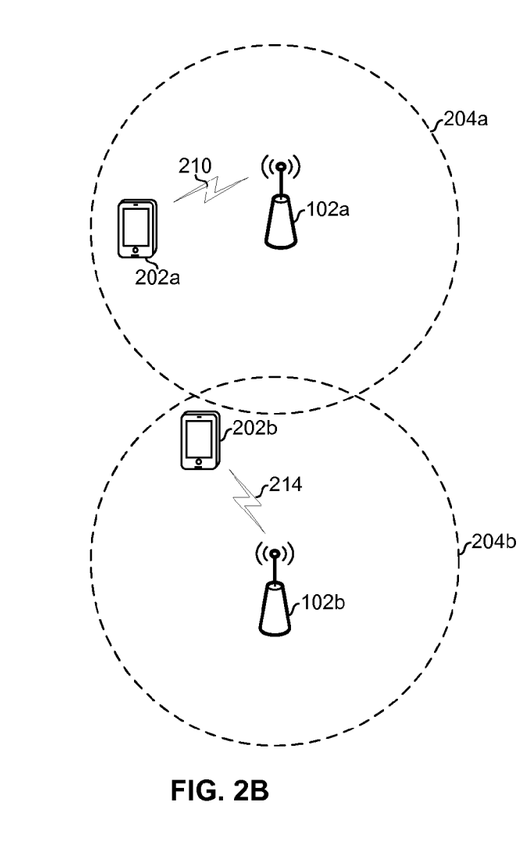

FIGS. 2A and 2B illustrate configuration of a cell boundary in response to a backhaul connection becoming congested. In FIG. 2A, there is shown the base station 102a, the base station 102b, a coverage area 204a of the base station 102a, a coverage area 204b of the base station 102b, and mobile devices 202a and 202b.

Each of the mobile devices 202a and 202b may comprise circuitry operable to communicate utilizing one or more wireless protocols (e.g., LTE protocols). Each of the mobile devices 202a and 202b may be, for example, a cellphone, a tablet computer, or a laptop computer.

In FIG. 2A, the base station 102a is serving mobile device 202a via a wireless connection 210 and serving mobile device 202b via a wireless connection 212. For illustration, assume that connection 104a (see FIG. 1A) to the base station 102a is congested as a result of the traffic to and/or from the mobile devices 202a and 202b and/or other traffic from non-base station devices on the connection 104a. Further assume that connection 104b (see FIG. 1A) to base station 102b is not congested. The base station manager 114 may detect that the connection 104a is congested but that connection 104b is not. FIG. 2B illustrates an example response of the network manager to the detected conditions on the connections 104a and 104b. Specifically, FIG. 2B illustrates a response in which the base station manager 114 reconfigures one or more parameter values to cause the coverage areas 204a and 204b to be altered.

Moving from FIG. 2A to FIG. 2B, the reconfiguring results in the mobile device 202b being handed-over to the base station 102b such that the mobile device 202b is now serviced via the connection 214 to base station 102b. After the handover, traffic to and from the mobile device 202b is backhauled over connection 104b rather than connection 104a, thus alleviating the congestion on connection 104a.

Figure 3A:
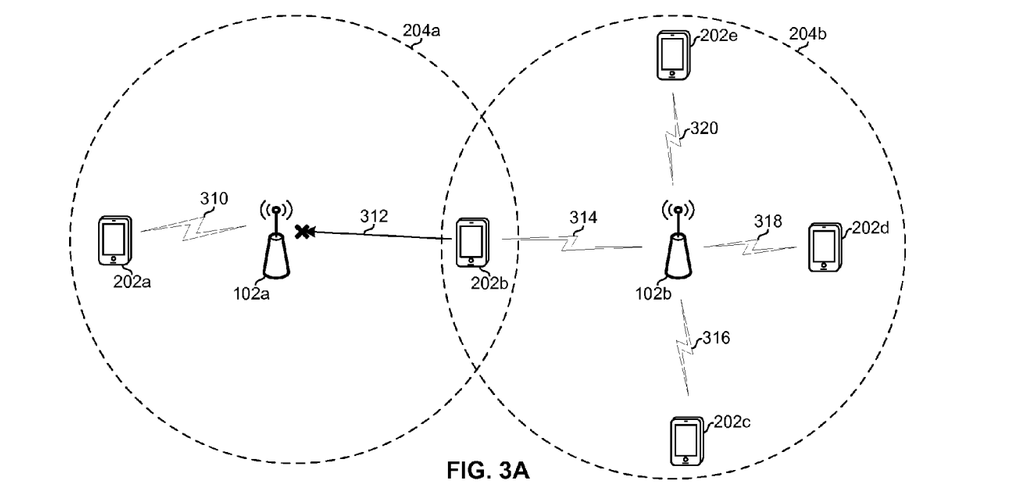
FIGS. 3A and 3B illustrate an example configuration and reconfiguration of parameter values to mitigate congestion in a small cell network.

FIG. 3A illustrates an example configuration of parameter values to mitigate congestion in a small cell network. In FIG. 3A, there is shown the base station 102a and its coverage area 204a, the base station 102b and its coverage area 204b, and mobile devices 202a-202e.

Each of the mobile devices 202a-202e may comprise circuitry operable to communicate utilizing one or more wireless protocols (e.g., LTE protocols). Each of the mobile devices 202a-202e may be, for example, a cellphone, a tablet computer, or a laptop computer.

In FIG. 3A, the base station 102a is serving mobile device 202a via a wireless connection 310 and base station 102b is service mobile devices 202b-202e via connections 314, 316, 318, and 320, respectively. For illustration, assume that connection 104a (see e.g., FIG. 1A) to the base station 102a is congested as a result of the traffic to and/or from mobile device 202a and other traffic from non-base station devices on the connection 104a. Further assume that connection 104b (see e.g., FIG. 1A) to base station 102b is not congested (e.g., because connection 102b is not carrying a high traffic load from non-base station devices). The base station manager 114 may detect that connection 104a is congested but that connection 104b is not. FIG. 3A illustrates an example response of the network manager to these detected conditions. Specifically, FIG. 3A illustrates a response in which the base station manager 114 configures one or more parameter values of the base station 102a such that association of the mobile device 202b with the base station 102b are prevented (e.g., a request 312 from mobile device 202b may be dropped and/or responded-to with a denial).

Figure 3B:
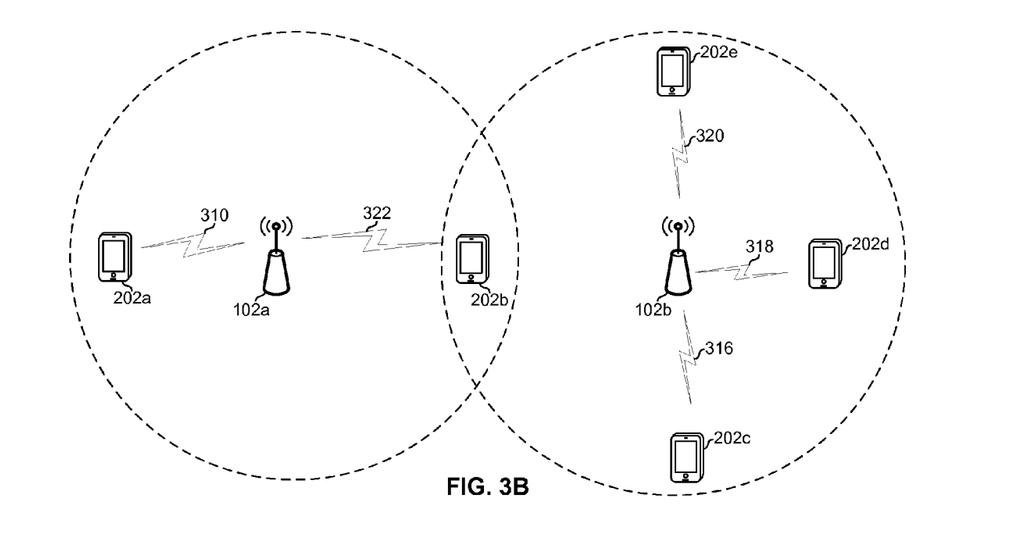

Moving from FIG. 3A to FIG. 3B, assume now that the connection 104b has become congested and the backhaul connection 104a is no longer congested. The base station manager 114 may detect that connection 104b is congested but that connection 104a is not. FIG. 3B illustrates an example response of the network manager to these detected conditions. Specifically, FIG. 3B illustrates a response in which the base station manager 114 configures one or more parameter values of the base station 102a such that the base station 102a is configured to accept handovers from base station 102b, and may configure one or more parameters of the base station 102a and/or 102b such that handover occurs. For example, a transmit power utilized for the connection 314 may be reduced such that the mobile device 202b determines that associating with the base station 102a will provide better performance.

In an example implementation, the parameters associated with connection 314 may be configured without affecting the connections 316, 318, and 320. For example, transmit power may only be decreased for a channel (e.g., frequency, timeslot, and/or CDMA code) associated with the connection

314 while transmit power for channel(s) associated with the connections 316, 318, and 320 may remain the same.

Figure 4:
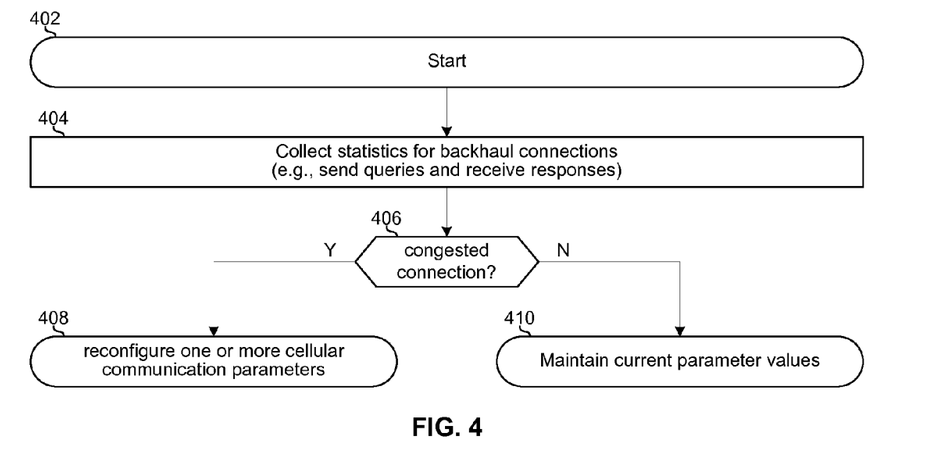
FIG. 4 is a flow chart illustrating example steps for managing a network of small-cell base stations to mitigate the impact of congestion on backhaul connections.

FIG. 4 is a flow chart illustrating example steps for managing a network of small-cell base stations to mitigate the impact of congestion on backhaul connections. In step 404, after start step 402, the base station manager 114 may collect information about one or more connections which serve as backhaul connections for one or more small-cell base stations. The collected information may include the information depicted in FIG. 1D and/or may include other information. In step 406, the collected information may be utilized to determine whether one or more of the backhaul connections are congested. The determination in step 406 may, for example, be made utilizing equations 1, 2, and/or 3 described above. If one or more backhaul connections are determined to be congested, then in step 408, one or more parameter values may be configured to, for example, reduce a load on the congested connection, shift traffic from a congested connection to an uncongested connection, and/or prevent the congestion from worsening. Returning to step 406, if none of the backhaul connections are congested, the steps may advance to step 410 and a current configuration of the network may be maintained.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for traffic management for base stations backhauled over data-capped network connections.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method comprising:
   determining a maximum amount of data that a second service provider permits to be communicated over a network connection during a billing period, wherein said network connection is a backhaul connection between a core network of a first service provider and a first one of a plurality of small-cell base stations;
   determining, in a network device of the first service provider, that a total amount of data communicated over said network connection during a current billing period will exceed said maximum amount of data when M is greater than $(D-B)/T$, where:
   M is a traffic load on said network connection communicated by said second service provider providing at least two services;
   D is a periodic data cap imposed by said second service provider on said network connection;
   B is a total amount of data consumed by a selected one of the at least two services provided by the second service provider over said network connection during said current billing period; and
   T is an amount of time remaining in said current billing period, measured in units of time; and
   in response to said determining that said total amount of data communicated over said network connection during said current billing period will exceed said maximum amount of data, reconfiguring a value of one or more cellular communication parameters utilized by one or more of said plurality of small-cell base stations.

2. The method of claim 1, wherein said total amount of data communicated over said network connection during said current billing period includes data communicated between non-base station devices.

3. A method comprising:
   determining, in a network device, whether a backhaul connection between a core network of a first service provider and a first base station is congested, said backhaul connection determined to be congested when M is greater than $(D-B)/T$, where:
   M is a traffic load on said backhaul connection communicated by a second service provider providing at least two services;
   D is a periodic data cap imposed by said second service provider on said backhaul connection;
   B is a total amount of data consumed by a selected one of the at least two services provided by the second service provider over said backhaul connection during a current time period; and
   T is an amount of time remaining in said current time period, measured in units of time; and
   in response to a determination that said backhaul connection is congested, performing, by said network device, a configuration of a value of one or more cellular communication parameters utilized by said first base station.

4. The method of claim 3, wherein said traffic load on said backhaul connection comprises one or more of:
   an instantaneous traffic load on said backhaul connection;
   an average traffic load on said backhaul connection during said current time period; or
   an average traffic load on said backhaul connection during one or more previous time periods.

5. The method of claim 3, wherein said one or more cellular communication parameters comprise one or more of: whether to accept inbound handovers or whether to initiate outbound handovers.

6. The method of claim 3, wherein said one or more cellular communication parameters comprise one or more of: minimum quality of service (QoS) level, transmit power, receive sensitivity, allocated bandwidth, or scheduling frequency.

7. The method of claim 3, comprising, in performing said determining whether said backhaul connection is congested, accounting for backhaul data of said first base station and data communicated between non-base station devices.

8. The method of claim 3, wherein cellular connections handled by said first base station are associated with said first service provider.

9. The method of claim 3, wherein said first base station is installed in a building and said backhaul connection provides Internet access to said building.

10. The method of claim 3, wherein said configuring of said one or more cellular communication parameters triggers a handover of one or mobile devices from said first base station to a second base station whose connection is determined to not be congested.

11. The method of claim 10, wherein said configuring of said one or more cellular communication parameters comprises reducing a transmit power utilized by said first base station such that a coverage area of said first base station is reduced, thereby triggering said handover.

12. A system comprising: a network device coupled to a first base station via a backhaul connection, said network device being configured to: determine whether said backhaul connection between a core network of a first service provider and the first base station is congested, said backhaul connection determined to be congested when M is greater than $(D-B)/T$, where: M is a traffic load on said backhaul connection communicated by a second service provider providing at least two services; D is a periodic data cap imposed by said second service provider on said backhaul connection; B is a total amount of data consumed by a selected one of the at least two services provided by the second service provider over said backhaul connection during a current time period; and T is an amount of time remaining in said current time period, measured in units of time; and in response to a determination that said backhaul connection is congested, configure one or more cellular communication parameters utilized by said first base station.

13. The system of claim 12, wherein said one or more cellular communication parameters comprise one or more of: minimum quality of service (QoS) level, transmit power, receive sensitivity, allocated bandwidth, or scheduling frequency.

14. The system of claim 12, wherein:
in addition to backhaul data of said first base station, said backhaul connection carries data communicated between non-base station devices; and
said data communicated between said non-base station devices is accounted for when performing said determination of whether said backhaul connection is congested.

15. The system of claim 12, wherein said network device is configured to, in response to a determination that said backhaul connection is congested, trigger a handover of a mobile device from said first base station to a second base station.

16. The system of claim 15, wherein said configuring of said one or more cellular communication parameters comprises reducing a transmit power utilized by said first base station such that a coverage area of said first base station is reduced, thereby triggering said handover.

* * * * *